(12) United States Patent
Thomson et al.

(10) Patent No.: US 9,560,202 B2
(45) Date of Patent: Jan. 31, 2017

(54) AUTOMATIC CONTACT CENTER ADMINISTRATION UPDATES BASED ON ACCEPTANCE OF A BROADCAST REQUEST

(75) Inventors: Rodney A. Thomson, Westminster, CO (US); Brian J. Reynolds, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 1022 days.

(21) Appl. No.: 13/419,092

(22) Filed: Mar. 13, 2012

(65) Prior Publication Data

US 2013/0243169 A1 Sep. 19, 2013

(51) Int. Cl.
*H04M 11/00* (2006.01)
*H04M 3/51* (2006.01)
*H04M 3/523* (2006.01)

(52) U.S. Cl.
CPC .......... *H04M 3/5175* (2013.01); *H04M 3/523* (2013.01)

(58) Field of Classification Search
CPC .................................................. H04M 3/5175
See application file for complete search history.

(56) References Cited

U.S. PATENT DOCUMENTS

| | | | | |
|---|---|---|---|---|
| 5,524,147 | A * | 6/1996 | Bean | 379/266.03 |
| 7,110,523 | B2 * | 9/2006 | Gagle et al. | 379/265.01 |
| 7,110,525 | B1 * | 9/2006 | Heller | H04M 3/523 379/265.11 |
| 7,372,952 | B1 * | 5/2008 | Wu | H04M 3/5233 370/352 |
| 7,729,277 | B2 * | 6/2010 | Jordan et al. | 370/252 |
| 7,787,609 | B1 * | 8/2010 | Flockhart | H04M 3/5233 379/265.01 |
| 8,351,594 | B2 * | 1/2013 | Ristock et al. | 379/265.02 |
| 8,577,015 | B2 * | 11/2013 | Flockhart | H04M 3/5233 379/265.02 |
| 2004/0028210 | A1 * | 2/2004 | Duncan | H04M 3/51 379/265.01 |
| 2006/0123060 | A1 * | 6/2006 | Allen et al. | 707/200 |
| 2007/0055777 | A1 * | 3/2007 | Lawrence | H04M 3/5232 709/226 |
| 2012/0101867 | A1 * | 4/2012 | Zgardovski | G06Q 10/06311 705/7.15 |
| 2013/0177149 | A1 * | 7/2013 | Thomson et al. | 379/266.01 |
| 2013/0243179 | A1 * | 9/2013 | Thomson et al. | 379/265.12 |
| 2014/0169549 | A1 * | 6/2014 | Desai | H04M 3/5238 379/266.1 |
| 2014/0278646 | A1 * | 9/2014 | Adrian et al. | 705/7.15 |

OTHER PUBLICATIONS

Thomson et al., U.S. Appl. No. 13/348,408, Entitled "Apply Time for Temporary Adminstrative Changes", filed Jan. 11, 2012, 17 pages.
Thomson et al., U.S. Appl. No. 13/348,412, Entitled "Performance Center Mobile Supervisor Application", filed Jan. 11, 2012, 25 pages.

* cited by examiner

*Primary Examiner* — Joseph T Phan
(74) *Attorney, Agent, or Firm* — Sheridan Ross P.C.

(57) ABSTRACT

Methods and systems for automatically implementing contact center administration updates based on acceptance of a broadcast request are provided. In particular, a request can be broadcast to a target audience. Acceptance of the request by members of the target audience automatically implements changes defined in connection with the request for accepting agents. The broadcast request can be recalled under certain conditions. In addition, the action or actions implemented in response to the acceptance of the request can be undone under various conditions.

20 Claims, 5 Drawing Sheets

AUTOMATIC CONTACT CENTER ADMINISTRATION UPDATES BASED ON ACCEPTANCE OF A BROADCAST REQUEST

FIELD

The present invention is directed to contact center monitoring and control. More particularly, embodiments provide for the implementation of commands entered with respect to a contact center upon the acceptance of a broadcast request.

BACKGROUND

Contact centers, which typically are associated with human agents, are used to provide customer service and support. The agents associated with a contact center can be assigned to handle contacts that have been placed in one or more queues established by the contact center. In general, different agents are assigned to handle contacts from different queues based on the attributes or requirements of the queues, and the attributes or capabilities of the individual agents. Usually, agents associated with a contact center are capable of handling contacts from different queues. However, agents are usually assigned to handle contacts from queues to which the individual agents are best matched. Individual queues associated with the contact center can experience unacceptably long wait times, or can otherwise enter an in trouble status, when an unusually large number of contacts are placed in a queue, where an inadequate number of agents are assigned to handle contacts from the queue, or for other reasons. Therefore, it is sometimes necessary or desirable to alter agent assignments.

In order to maintain service requirements, for example to avoid wait times that are too long, systems have been developed to reallocate agents automatically. Automatic systems typically implement algorithms that enable or disable queue assignments. Alternatively or in addition, contact centers can be controlled manually by a supervisor or administrator. For example, an administrator can change the queue assignments for individual agents or sets of agents. In addition to changing the control parameters associated with the operation of automatic call distribution systems, supervisors can initiate communications to agents on an individual basis, to request that the agent assist with handling contacts from an in trouble queue. However, previous systems do not allow a supervisor to initiate a broadcast request for agents to accept modified duties that can be implemented automatically upon an affirmative response from a receiving agent. Previous systems also do not provide notification to agents that the agents' queue allocations have changed. Moreover, previous systems do not provide for the automatic expiration of an administered change or a request to modify duties when the need has been met, or under other circumstances.

SUMMARY

Systems and methods that support the sending of broadcast messages to agents in a contact center related to actions to address the health or performance of a queue within the contact center are provided. More particularly, a supervisor can send a real time or non-real time message requesting that agents volunteer to address a problem with respect to a queue. The target audience of agents can accept, ignore, or decline the request. If the request is accepted, the action defined by the supervisor can be applied for the agents accepting the request automatically. The action can include a reassignment of the accepting agents from a previously assigned queue to a queue in trouble. In addition, changes entered with respect to agents who accept the action can be reversed under certain conditions. These conditions can, for example but without limitation, include the reversal of the action by the supervisor, the expiration of a predetermined period of time, or the return of the queue to a healthy status.

Methods in accordance with embodiments of the present invention can include identifying members of a target audience. The members of the target audience can include agents who are capable of assisting a selected queue. As an example, but without limitation, such agents can include agents previously assigned to the selected queue who are assigned to a queue requiring skill sets related to the selected queue, and who have an assigned attribute that is currently disabled. The agents in the target audience can respond individually to the broadcast message by accepting or rejecting the request. If the request is accepted by an agent, the action defined by the supervisor will be applied for that agent. For example, an agent assigned to a different queue can be reassigned to the selected queue. As a further example, an agent assigned to the selected queue but working on another queue can be assigned a higher proficiency level with respect to the selected queue. The method can additionally include determining whether a sufficient number of agents within the target audience have responded with an acceptance of the request. If a sufficient number of agents have responded by accepting the request, the broadcast request with respect to other agents within the target audience can be rescinded. The broadcast request can also be rescinded under other conditions, such as a manual reversal of the request by the supervisor, the expiration of a predetermined period of time, or a return of the selected queue to a healthy status. In addition, a supervisor can make an additional broadcast request, for example to a different or a larger target audience if the initial broadcast request was not effective.

Systems implementing embodiments of the present disclosure can provide an automatic call distribution (ACD) control system application and/or a monitor and control application running on an ACD server and/or a supervisor device. The applications can provide a user interface that presents information regarding the health of queues within the contact center to the supervisor. Through the user interface, the supervisor can initiate broadcast messages to target audiences. The applications can further identify agents who accept the broadcast requests, and can enter changes to implement the action defined by the supervisor or recommended by the system. For example, if the system knows that an agent is not currently assigned and the selected queue needs additional agents, the system can recommend adding the selected queue assignments with a sufficient proficiency such that the selected queue takes priority. The application can further operate to rescind the broadcast request when a sufficient number of agents have responded with an acceptance, after a predetermined period of time has elapsed since the broadcast request was sent, after the selected queue has returned to a healthy status, or in response to manual input by the supervisor.

Methods in accordance with embodiments of the present disclosure include identifying members of a target audience to receive a broadcast request. The method initially includes assigning an action to be applied upon an acceptance of the broadcast request by a member of the target audience. The message is then sent to the members of the target audience. In response to receiving an acceptance of the broadcast request from a member of the target audience, the action indicated by the broadcast message is implemented. In accordance with further embodiments, implementing the action includes a reallocation of at least some of the members of the target audience that responded with an acceptance of the broadcast request. The method can additionally include selecting a queue of a contact center, wherein identifying members of a target audience includes identifying contact center agents who can be assigned to the selected queue. The selected queue can be a queue that is identified as a queue that is in trouble. The reallocation of at least some of the members of the target audience that responded with an acceptance of the broadcast request is effected by at least one of: assigning at least one contact center agent to the selected queue, and altering a proficiency level of at least one contact center agent with respect to the selected queue. In accordance with further embodiments, the action indicated by the broadcast message can be reversed and/or the broadcast message can be rescinded. Reversing the action and/or rescinding the broadcast message can be performed after at least one of: the receipt of a sufficient number of acceptances from members of the target audience; the expiration of a predetermined period of time; a manual input to reverse the action or to rescind the message; and a return of the selected queue to a healthy state. The action indicated by the broadcast message is not taken with respect to a member of the target audience who declines to accept the action indicated by the message. A member of the target audience can be deemed to decline to accept the action indicated by the message where that member of the target audience has failed to respond with an acceptance of the broadcast message within a predetermined period of time. Identifying the members of the target audience can include selecting contact center agents from an ordered list of contact center agents. In accordance with at least some embodiments of the present disclosure, the broadcast message is sent to the members of the target audience as at least one of: an instant message, an email, a voice message, a voicemail message, or a collaboration message.

In accordance with further embodiments, a computer readable medium having stored thereon computer executable instructions causing a processor to execute a method for entering actions in response to acceptance of a request by agents in a communication system that includes at least a first contact center is provided. The instructions include instructions to identify at least a first queue maintained with respect to the first contact center. The instructions are further operable to send a message to each of the agents included in an identified target audience, wherein the message includes a request to assent to an action to be applied in response to an acceptance of the request by a member of the target audience. Moreover, the instructions include instructions to identify agents included in the identified target audience who indicate an acceptance of the request. The instructions further apply the action indicated by the message for the agents who have responded with an acceptance of the request. The action indicated by the message can include a modification of an assignment of the agents included in the identified target audience. In addition, an action modifying an assignment of the agents included in the identified target audience can be performed for those agents indicating an acceptance of the request through the application of the action for the agents who have responded with an acceptance of the request. The action modifying an assignment of the agents included in the identified target audience performed for at least some of the agents indicating an acceptance of the request can be reversed after at least one of: a manual reversal of the action; an expiration of a predetermined period of time; and a determination that a queue to which the agents indicating an acceptance of the request are assigned as a result of the action is in a healthy state. The instructions can further include instructions to receive input from a supervisor assigning the action to be applied in response to an acceptance of the request. In addition, the instructions can include instructions to receive input from the supervisor selecting a queue for which the action is to be applied and selecting the members of the target audience.

In accordance with further embodiments, an automatic call distribution (ACD) system is provided. The ACD system includes a plurality of agent workstations, wherein at least some of the agent workstations are associated with a human agent. The system initially includes an ACD server, wherein the plurality of agent workstations are interconnected to the ACD server. The ACD server includes a processor, memory, and application programming stored in the memory and executed by the processor, wherein at least a first queue of contacts is established by the ACD server, wherein the application programming is operable to provide information regarding a status related to the first queue, and wherein the application programming is operable to receive commands related to an assignment of human agents to the at least a first queue. The system additionally includes a user interface running on at least one of the ACD server and a supervisor device, wherein the user interface is operable to receive input from a user to send a request to a set of human agents to take an action to modify a current assignment of the human agents, wherein the message is sent to the human agents, and wherein the application programming of at least one of the ACD server and the supervisor device is operable to implement the action to modify a current assignment of those human agents who have indicated as sent to the request. The application programming can additionally operate to rescind the broadcast message after at least one of: a sufficient number of agents accept the request, the request is recalled, a predetermined period of time has expired, and the queue has returned to a healthy status. The application programming can additionally operate to reverse the action to modify a current assignment of those human agents who have indicated assent to the request after at least one of: a manual reversal of the action; an expiration of a predetermined period of time; and a determination that a queue to which the agents indicating an acceptance of the request are assigned has returned to a healthy state. In accordance with embodiments of the present disclosure, the human agents who have indicated assent to the request are those agents who have provided an input through an associated agent workstation indicating that they accept the request.

Additional features and advantages of embodiments of the present invention will become more readily apparent from the following description, particularly when taken together with the accompanying drawings.

DETAILED DESCRIPTION

Figure 1:
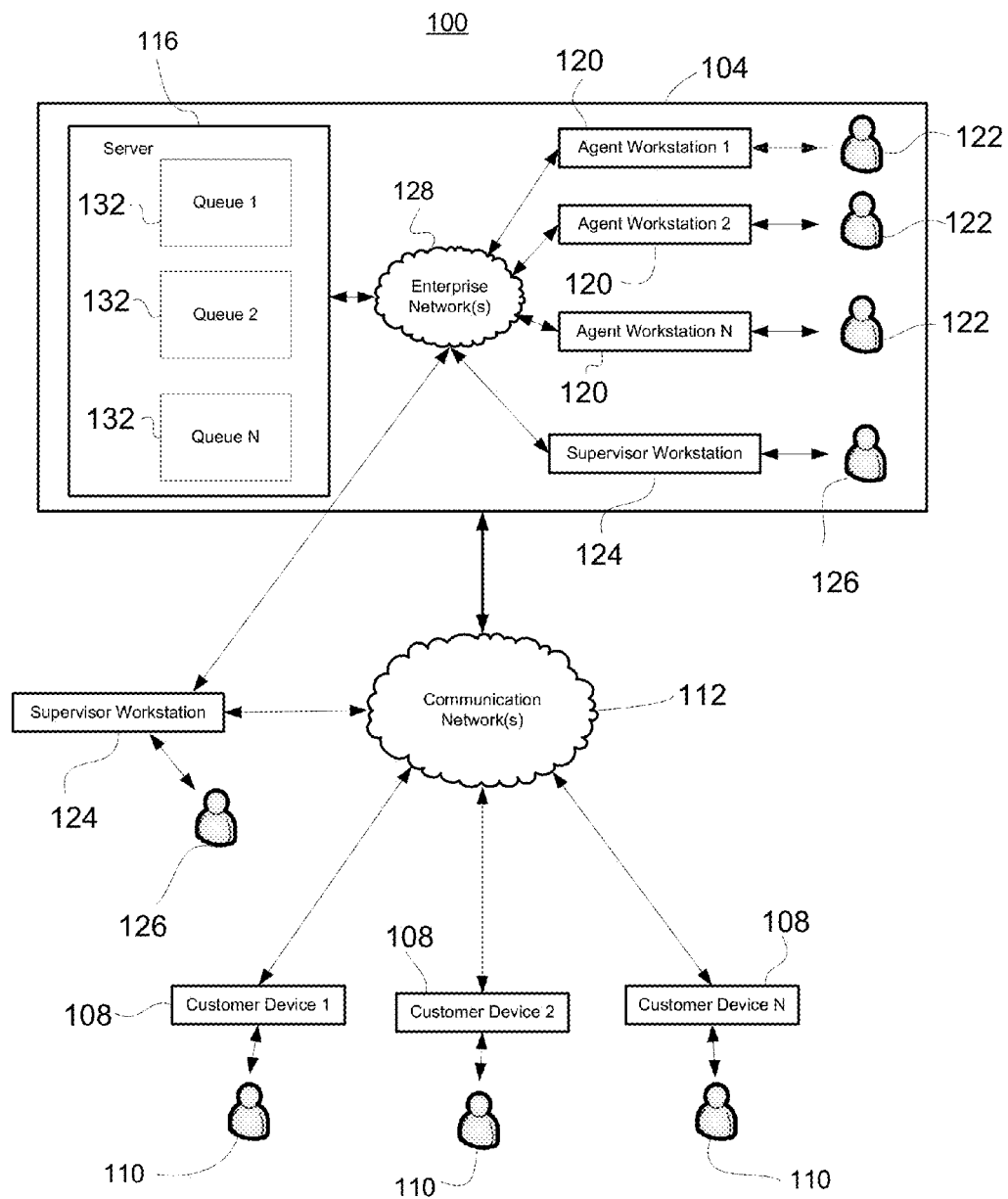
FIG. 1 is a block diagram depicting components of a system in accordance with embodiments of the present invention.

FIG. 1 is a block diagram depicting components of a communication system 100 in accordance with embodiments of the present invention. In particular, the communication system 100 includes one or more call or contact centers 104. Although a single contact center 104 is shown, a communication system 100 can have any number of contact centers 104. In general, the contact center 104 can be in communication with one or more customer endpoints or devices 108 via one or more communication networks 112. Examples of customer endpoints 108 include but are not limited to telephones, cellular telephones, and desktop or mobile computing devices, or any other device capable of supporting communications between a customer and a customer service or other agent associated with the contact center 104. Moreover, the communications between the contact center 104 and the customer endpoints 108 can comprise voice telephony, video telephony, email, instant messaging, short message system, or other real time or non-real time communications. The communication network 112 can include the Internet, local area network, wide area network, public switched telephony network (PSTN), wireless networks, or a plurality of networks in any combination. The contact center 104 generally includes a call or contact center server 116, such as an automatic contact (or call) distribution system (ACD) server 116. The ACD server 116 is illustratively the Avaya Aura® Call Center Elite enterprise communication-based ACD system. The ACD server 116 is interconnected to a plurality of agent workstations or endpoints 120. The agent workstations 120 may be connected to the ACD server 116 by a voice and/or data transmission median or enterprise network 128.

The ACD server 116 generally functions to connect agent workstations 120 to customer devices or endpoints 108 through the communication network 112, to place customers 110 in communication with agents 122. In addition, the ACD server 116 maintains queues 132 for servicing customer calls or other contacts. The different queues 132 can be used to sort contacts from (or to) customer endpoints 108 by type, identity of the customer 110 or contact, or any other attribute. Agents 122 associated with the agent workstations 120 are assigned to provide services to contacts that have been placed within one or more of the queues 132 based on availability and/or weighting factors.

In addition, embodiments of a communication system 100 can include a supervisor or administrator device 124. The supervisor device 124 is in communication with the ACD server 116 via the communication network 112 and/or the enterprise network 128. For example, if the supervisor device 124 is on the premises of the contact center 104, communications with the ACD server 116 may be over a portion of the enterprise network 128 comprising a wireless (e.g., a Wi-Fi) network. As another example, the supervisor device 124 may be in communication with the ACD server 116 over the communication network 112, for example via a cellular telephony data network, a Wi-Fi or a wired Ethernet connection outside of the enterprise network 128. In general, the supervisor device 124 provides functionality that allows a supervisor or other user 126 to monitor the health of the contact center 104, and to control aspects of the operation of the contact center 104.

The supervisor device 124 can comprise any device, including a mobile device, capable of presenting information to a supervisor 126, and of receiving control commands from the supervisor 126. In addition, the supervisor mobile device 124 is generally a device capable of running an application that provides a browser, template or framework for displaying information and receiving input with respect to such information. In addition, the supervisor device 124 is a device that is capable of wired or wireless communications over at least one of a variety of network types, including but not limited to cellular data networks (such as 3G or 4G networks), Wi-Fi networks, WiMax networks, Bluetooth connections, Ethernet networks, and the like. Accordingly, a supervisor device 124 can include, but is not limited to, a desktop computer, a tablet computer, a laptop computer, a Smartphone, a Netbook, a desktop computer, or the like.

Figure 2A:
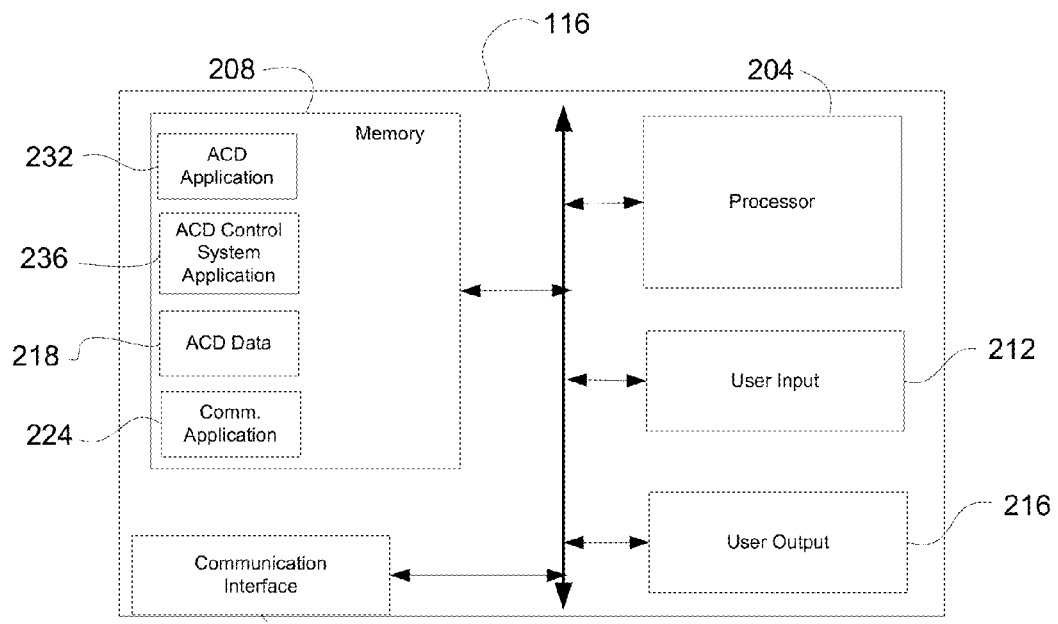
FIGS. 2A-2B are block diagrams of a contact center server and a supervisor device respectively in accordance with embodiments of the present invention.
Figure 2B:
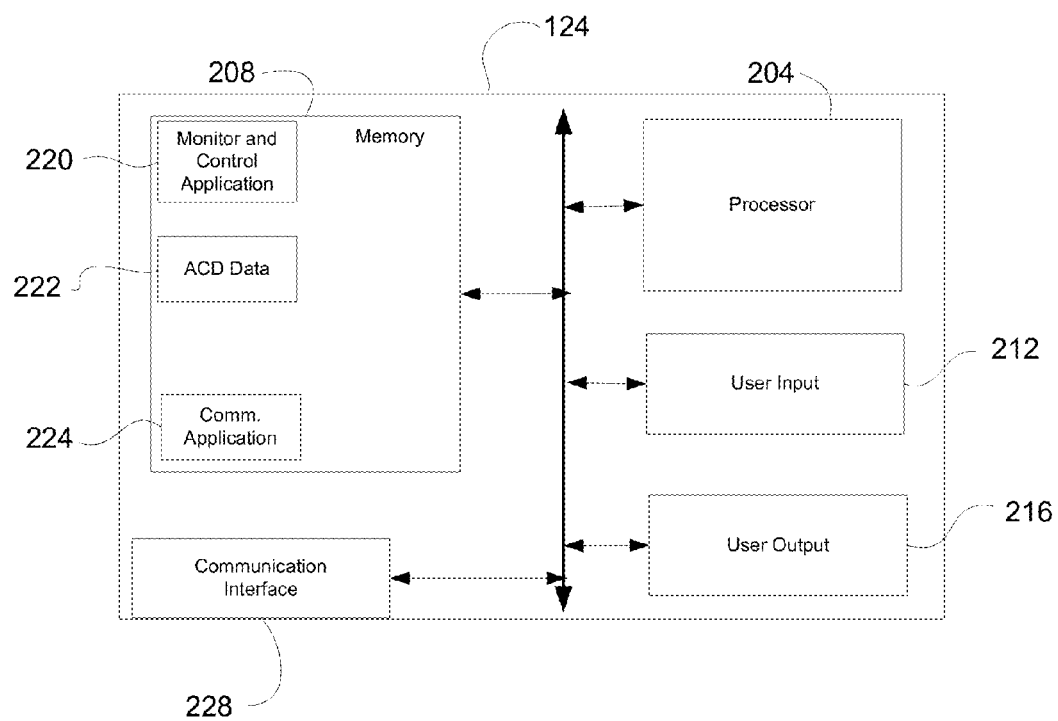

FIGS. 2A-2B are block diagrams depicting components of an ACD system 104 in accordance with embodiments of the present invention. More particularly, components of an ACD server 116 are shown in FIG. 2A, while components of a supervisor device 124 are shown in FIG. 2B.

As the ACD server 116 and the supervisor device 124 can, at least partially, be implemented as conventional computing devices, they share certain components in common. For example, each generally includes a processor 204 capable of executing program instructions. The processor 204 may include any general purpose programmable processor or controller for executing application programming. Alternatively, the processor 204 may comprise a specially configured application specific integrated circuit (ASIC). The processor 204 generally functions to run programming code implementing various functions performed by the associated ACD server 116 or supervisor device 124. For example, with respect to the ACD server 116 (see FIG. 2A), the processor 204 can implement functions including assigning incoming contacts received by the contact center 104 from customer endpoints 108 to contact queues 132 and to agent workstations 120 for handling by associated agents 122. As another example, with respect to the supervisor device 124 (see FIG. 2B), such functions may include displaying information regarding the operation of the communication system 100 and/or an included call center 104 to the supervisor 126, and to receiving commands input by the supervisor 126 with respect to the operation of a contact center 104. Moreover, as described in greater detail elsewhere herein, the ACD server 116 and the supervisor device 124 operate in cooperation with one another to provide monitoring and control functions to a supervisor 126, to assist in the operation of the contact center 104.

The ACD server 116 and the supervisor device 124 additionally include memory 208. The memory 208 can be used in connection with the execution of programming by the processor 204 of the associated device 116 or 124, and for the temporary or long term storage of data or program instructions. For example, the ACD server 116, as shown in FIG. 2A, can include a monitor and control application 220 and/or an automatic call distribution application 232 that is stored in memory 208. As an additional example, the ACD server 116 can operate in connection with the operation of an ACD control system application 236 stored in the memory 208 that functions as an adjunct to or in cooperation with the ACD call distribution application 232. The memory 208 of the ACD server 116 can also function as a store for records or other data 218 that is related to the ACD or contact queues 132 maintained by the ACD server 116. The memory 208 included in the supervisor device 124, as shown in FIG. 2B, can include a monitor and control application 220. As described in greater detail elsewhere herein, the monitor and control application 220, whether implemented on one or both of an ACD server 116 or a supervisor device 124, can provide a user interface to display information regarding the operation of the ACD system 104 to the supervisor 126 or other user, and to receive control input from the supervisor 126 or other user. The memory 208 in the supervisor device 124 can also provide storage for ACD system 104 data 222. The memory 208 of the ACD server 116 and/or the supervisor mobile device 124 can additionally provide storage for one or more communication applications 224. Examples of communication applications 224 include, but are not limited to, email, instant messaging, voice telephony, video telephony, and the like. The memory 208 of the ACD server 116 and/or the supervisor mobile device 124 can include solid state memory that is resident, removable and/or remote in nature, such as DRAM and SDRAM. Alternatively or in addition, the memory 208 can include magnetic, optical or other storage devices. Moreover, the memory can include a plurality of discrete components of different types and/or a plurality of logical partitions.

In addition, user input devices 212 and user output devices 216 may be provided. With respect to the ACD server 116, such devices 212 and 216 can be used in connection with the monitoring and control of the ACD system 104 by a supervisor 126 or an administrator in a conventional fashion, in which the supervisor 126 or administrator is tethered to the contact center 104. With respect to the supervisor device 124, the one or more user input devices 212 or one or more user output devices 216 facilitate the remote monitoring and control of the ACD system 104 by the supervisor 126 through the supervisor device 124. Examples of user input devices 212 include a keyboard, a numeric keypad, touch screen, microphone, scanner, and pointing device combined with a screen or other position encoder. Examples of user output devices 216 include a display, a touch screen display, a speaker, and a printer. As can be appreciated by one of skill in the art, a touch screen display may comprise a combined user input 212 and user output 216 device. The ACD server 116 and the supervisor mobile device 126 also generally include a communication interface 228 to interconnect the server 116 or device 126 to the networks 112 and 128.

Figure 3:
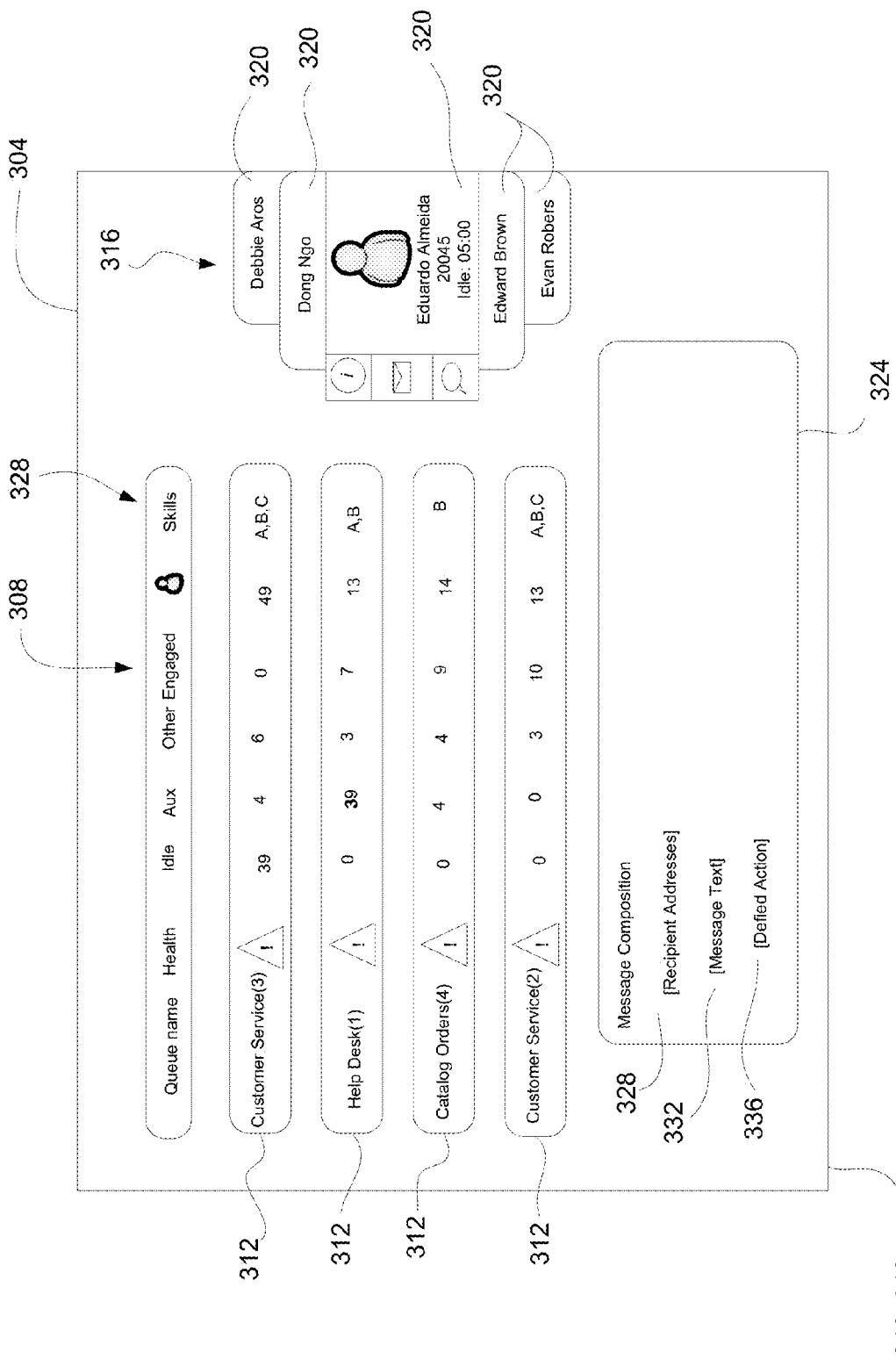
FIG. 3 depicts a user interface in accordance with embodiments of the present invention.

FIG. 3 depicts an exemplary page or screen that can be presented to a supervisor 126 or other user by a user interface 304 in accordance with embodiments of the present invention. The user interface 304 can be generated through operation of the ACD control system application 236 on one or a plurality of contact center servers 116 within the communication system 100, and/or in connection with a monitor and control application 220 running on an ACD server 116 and/or on a supervisor device 124. The user interface 304 can display information generated by the ACD application 232 and/or stored as ACD data 218. The user interface 304 can be presented by a user output 216 of a contact center server 116 and/or a supervisor device 124. Moreover, the user interface 304 can be interactive, in that it can provide fields, regions, buttons, menus, or other features to enable the user interface to receive input from a supervisor or administrator 126, including input concerning the control of a contact center 104, as well as to present information to the supervisor 126 textually and/or graphically.

More particularly, the user interface 304 presents queue status display information 308, with lines of data or queue information 312 that each display health information concerning a queue 132 associated with a contact center 104. The user interface 304 can, for example and without limitation, comprise a touch screen display 212, 216. The user interface also presents a set or stack of agents 316, in which individual agents 122 are each represented by a tile 320. The set of agents 316 can include a representation of all of the agents 122 associated with the contact center 104. Alternatively, the set of agents 316 can include those agents 122 who are candidates for assignment to a selected queue 132, and/or who are already assigned to a selected queue 132. The set of agents 316, as a further alternative, can include those agents 122 identified as a result of the performance of a search or the application of a filter implemented or initiated in response to input from the supervisor 126. Moreover, the user interface 304 can allow or provide a means by which a supervisor 126 can identify or select the members of a target audience from the set of agents 316.

In accordance with embodiments of the present disclosure, the user interface 304 can additionally include a message composition field 324. As can be appreciated by one of skill in the art after consideration of the present disclosure, the message composition field 324 can operate in association or cooperation with one or more communication applications 224. The message composition field 324 can include various subfields, such as a recipient address field 328, a message text field 332, and a defined action field 336. The recipient address field 328 allows a supervisor 126 to enter the addresses of the members of the target audience (i.e., agents 122). Alternatively or in addition, the recipient address field 328 can be populated automatically, for example in response to the selection of tiles 320 representing individual agents 122 or sets of agents from the list of agents 316. The message text field 332 allows the supervisor 126 to enter text, such as text describing the nature of the request that the supervisor 126 is making. As an example for purposes of illustration, and without limitation, the message text could identify a queue 132 that requires additional assistance, and that asks the agents 122 receiving the message (the target audience) to volunteer to discontinue their current status or activity in order to accept contacts from the in trouble queue 132. The message text field 332 can also be used to provide a description of the action that will be taken if an agent receiving the message accepts or otherwise assents to the request. For example, and without limitation, the message text 332 can include a statement that an agent 122 will be assigned to receive contacts from the queue 132 in trouble if they respond by accepting the request.

The defined action subfield 336 can be used to indicate the action that will be implemented in connection with any agent 122 who responds to the request with an acceptance. For example, and without limitation, a defined action 336 can include an assignment of an accepting agent 122 to the queue 132 in trouble.

Figure 4:
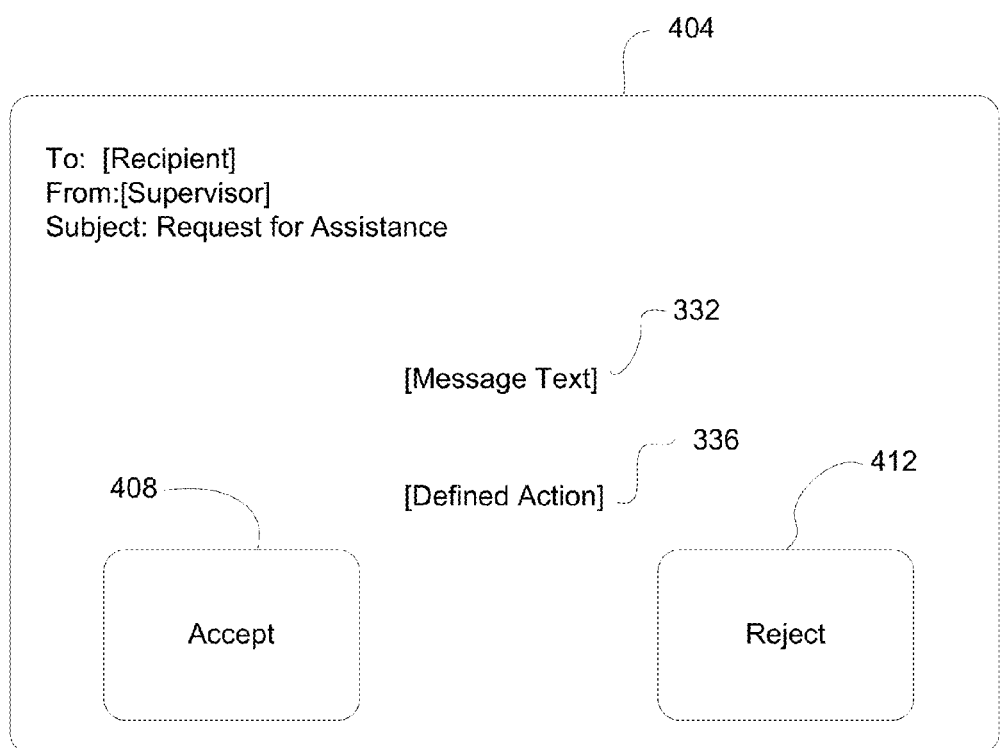
FIG. 4 depicts an example of a broadcast message in accordance with embodiments of the present invention.

FIG. 4 depicts an example broadcast message 404 in accordance with embodiments of the present disclosure. The message 404 can include the message text 332 entered by the supervisor 126. The message 404 can also include a description of the defined action 336 that will be taken if the recipient accepts or assents to the action. In addition, the message 404 can include input fields or radio buttons that can be selected by a receiving agent 122. As examples, a radio button marked "accept" 408 can be selected if the agent 122 accepts or assents to the request set forth in the message 404. Upon acceptance of the request, the action indicated by the message can be implemented. For example, by selecting the accept button 408, a signal can be sent to the ACD control system application 236, and in response, the ACD control system application 236 will implement the defined action 336 with respect to the accepting agent 122.

As a further example, the message 404 can include a button marked "reject" 412. By selecting the reject button 412, an agent 122 can indicate a refusal to accept the request. The acceptance or rejection of the request by an agent 122 can be recorded by an operational transaction data store, for example as ACD data 218, and/or by the ACD control system application 236. As an example, the acceptance of the request by an agent 122 receiving the broadcast message can be communicated to the ACD control system application 236 via a communication application 224, and/or a communication function of a monitor and control application 220 and/or the ACD control system application 236.

Figure 5:
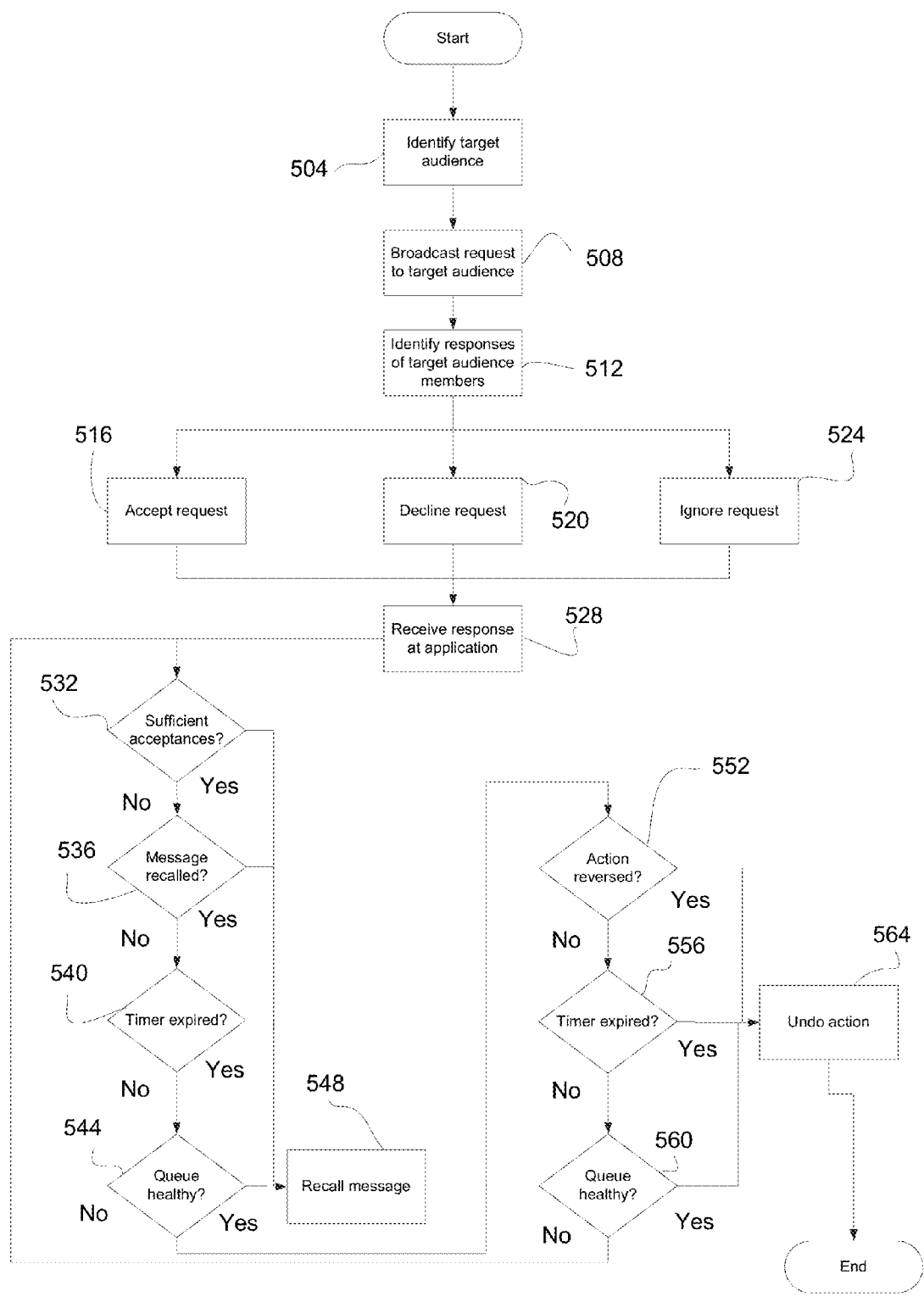
FIG. 5 is a flowchart depicting aspects of a method in accordance with embodiments of the present invention.

With reference now to FIG. 5, aspects of a method for performing automatic contact center 104 administration updates based on acceptance of a broadcast request are depicted. Initially, at step 504, a target audience is identified. The target audience can be selected by a supervisor 126, through input entered in connection with the user interface 304. In general, the target audience includes a set of agents 122 associated with the contact center 104. Moreover, the agents 122 included in the target audience can comprise those agents 122 who are qualified to handle contacts associated with a selected queue 132. At step 508, a request is broadcast, for example in the form of a message 404, to the members of the target audience. The message can comprise a request that agents 122 receiving the message volunteer to accept contacts from a selected queue 132. Typically, but not necessarily, the selected queue 132 is a queue that is in trouble, such as a queue that is experiencing unacceptably long wait times, or that is otherwise in an unhealthy state. Responses by the target audience members are then identified (step 512). Responses can include responses that accept the request (step 516), and responses declining the request (step 520). In addition, a response comprising a request that has been ignored can be identified, for example where the request is not responded to within a predetermined period of time (step 524).

Responses to the request are received at the monitor and control application 220 and/or the ACD control system application 236, or a determination that a request has been ignored can be made by one of these applications, or by some other application (step 528). At step 532, a determination can be made as to whether a sufficient number of acceptances have been received. A sufficient number of acceptances can be defined as a predetermined number of acceptances. The sufficient number of acceptances can be a fixed number, or can be a variable number based on the attributes of the agents 122 who have accepted the request. For example, a smaller number of acceptances may be deemed sufficient where the accepting agents 122 are, on average, associated with a high skill level. Conversely, a relatively larger number of acceptances may be required where the accepting agents 122 are, on average, associated with a relatively low skill level. If a sufficient number of acceptances have not been received, a determination can next be made as to whether the request has been recalled (step 536). For example, a supervisor may manually discontinue or recall the message presenting the request. If the request is not recalled, a determination can next be made as to whether a predetermined period of time has expired since the broadcast message was sent (step 540). If a predetermined period of time has not expired, a determination can be made as to whether the queue 132 with respect to which the request was made has returned to a healthy state (step 544). If a sufficient number of acceptances have been received, the request has been recalled, the predetermined period of time has expired, and/or the queue 132 is returned to a healthy status, the request can be recalled or rescinded (step 548). Rescinding the request can include discontinuing a presentation of the request by the agent workstations 120 associated with the agents 122 in the target audience. For example, where a message 404 comprising the request is presented by the agent workstations 120 of the agents 122 in the target audience through operation of the ACD control system application 236 and/or other applications executed by the ACD server 116, the presentation of the message 404 can be discontinued. As a further example, where the message 404 is sent as an instant message, that instant message can be recalled, and/or a subsequent instant message indicating that the request has been recalled can be sent to the target audience. As a further example, where the message 404 is sent as an email, the email can be recalled, and/or a further email indicating that the request has been recalled can be sent to the members of the target audience.

After recalling the message 404, or if the message 404 has not been rescinded, a determination can be made as to whether the action has been reversed (step 552). More particularly, the action implemented with respect to agents 122 who accept the request can be reversed in response to input by the supervisor 126. Such input can be entered through the user interface 304. If the action has not been reversed, a determination can next be made as to whether a predetermined period of time since the action was implemented has expired (step 556). If the predetermined period of time has not expired, a determination can next be made as to whether the queue 132 with respect to which the request was made has returned to a healthy status (step 560). If the action has not been reversed, the predetermined period of time has not expired, or the queue 132 has not returned to a healthy status, the process can return to step 532. If the action has been reversed, the predetermined period of time has expired, or the queue 132 has returned to a healthy status, the action can be undone or reversed (step 564). Undoing the action can include returning the status of the agents 122 who accepted the request to the status they were in prior to accepting the request. For example, queue assignments made with respect to an agent who accepted the request can be removed. Alternatively or in addition, the agents 122 who had accepted the request can be placed in their scheduled status, for the time at which the action is undone. The process can then end.

Embodiments of the disclosed invention provide for automatic contact center administration updates based on acceptance of a broadcast request. The broadcast request can be made through real time or non-real time requests or messages that apply an administration update for those recipient agents 122 accepting the broadcast request. The broadcast request can expire based on a sufficient number of acceptances, the expiration of some period of time, the return of the queue 132 associated with the request to a status in which all of its objectives are being met, a manual recall by the supervisor 126, or the like. As a result, a broad range of recipient agents 122 can be targeted with the request, and administration changes can automatically be applied only to those agents that affirmatively accept the request. Moreover, the system is flexible in that the supervisor can assign the action that is taken upon an acceptance of the request by an agent 122 in response to the broadcast message. Moreover, the action taken with respect to agents 122 that accept the request reversed or undone based on time, the return of the queue to a state in which the business objectives of the queue are being met, or a manual recall.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
   identifying, by a microprocessor, members of a target audience to receive a broadcast request;
   assigning, by the microprocessor, an action to be applied upon an acceptance of the broadcast request by a member of the target audience;
   sending, by the microprocessor, a message to the members of the target audience;
   in response to receiving an acceptance of the broadcast request from the member of the target audience, implementing, by the microprocessor, an action indicated by the broadcast request; and
   reversing, by the microprocessor, the action indicated by the broadcast request, wherein reversing the action is performed after at least one of: an expiration of a predetermined period of time; a manual input to rescind the action; and a return of the selected queue to a healthy state.

2. The method of claim 1, wherein implementing the action includes a reallocation of at least some of the members of the target audience that responded with an acceptance of the broadcast request.

3. The method of claim 2, further comprising:
   selecting, by the microprocessor, a queue of a contact center, wherein identifying members of a target audience includes identifying contact center agents who can be assigned to the selected queue.

4. The method of claim 3, wherein selecting a queue of a contact center includes selecting a queue that is identified as being in trouble.

5. The method of claim 4, wherein the reallocation of at least some of the members of the target audience that responded with an acceptance of the broadcast request is effected by at least one of: assigning at least one contact center agent to the selected queue, and altering a proficiency level of at least one contact center agent with respect to the selected queue.

6. The method of claim 5, further comprising:
   rescinding, by the microprocessor, the broadcast request, wherein rescinding the broadcast request is performed after at least one of: a receipt of a sufficient number of acceptances from members of the target audience; the expiration of a predetermined period of time; the manual input to rescind the broadcast request; and the return of the selected queue to a healthy state.

7. The method of claim 1, wherein the action indicated by the broadcast request is not taken with respect to a member of the target audience who declines to accept the action indicated by the message.

8. The method of claim 7, wherein a member of the target audience is deemed to decline to accept the action indicated by the message where that member of the target audience has failed to respond with an acceptance of the broadcast request within the predetermined period of time.

9. The method of claim 3, wherein identifying members of the target audience includes selecting contact center agents from an ordered list of contact center agents.

10. The method of claim 3, wherein the broadcast request is sent to the members of the target audience as at least one of: an instant message, an email, a voice message, a voice mail message, or a collaboration message.

11. A system comprising:
    a microprocessor; and
    a computer readable medium, coupled with the microprocessor and comprising microprocessor readable and executable instructions that program the microprocessor to:
    identify at least a first queue maintained with respect to the first contact center;
    send a message to each of the agents included in an identified target audience, wherein the message includes a request to assent to an action to be applied in response to an acceptance of the request by a member of the target audience;
    identify agents included in the identified target audience who indicate an acceptance of the request;
    apply the action indicated by the message for the agents who have responded with an acceptance of the request; and
    reverse the action indicated by the broadcast request, wherein reversing the action is performed after at least one of: an expiration of a predetermined period of time; a manual input to rescind the action; and a return of the selected queue to a healthy state.

12. The system of claim 11, wherein the action indicated by the message includes a modification of an assignment of the agents included in the identified target audience.

13. The system of claim 12, wherein the action modifying an assignment of the agents included in the identified target audience is performed for those agents indicating an acceptance of the request through the application of the action for the agents who have responded with an acceptance of the request.

14. The system of claim 11
    wherein the instructions that program the microprocessor further comprise instructions to receive input from a supervisor assigning the action to be applied in response to an acceptance of the request.

15. The system of claim 14
    wherein the instructions that program the microprocessor further comprise instructions to receive input from the supervisor selecting a queue for which the action is to be applied and selecting the members of the target audience.

16. The method of claim 1, wherein reversing the action is based on the manual input to rescind the action.

17. The method of claim 1, wherein reversing the action is based on the return of the selected queue to a healthy state.

18. The method of claim 5, wherein the reallocation of at least some of the members of the target audience that responded with an acceptance of the broadcast request is effected by altering the proficiency level of the at least one contact center agent with respect to the selected queue.

19. The method of claim 1, wherein assigning the action to be applied upon acceptance of the broadcast request by a member of the target audience comprises acceptance of the broadcast request by a sufficient number of the target audience and wherein the sufficient number of the target audience is based on one or more attributes of members of the target audience that accept the broadcast request.

20. The method of claim 19, wherein the one or more attributes of the members of the target audience that accept the broadcast request comprises a skill level of the members of the target audience that accept the broadcast request.

* * * * *